UNITED STATES PATENT OFFICE.

JOHN H. DOLDE, OF ST. LOUIS, MISSOURI, ASSIGNOR OF ONE-HALF HIS RIGHT TO SAML. L. CARTER, OF SAME PLACE.

IMPROVEMENT IN EXPLOSIVE COMPOUNDS.

Specification forming part of Letters Patent No. 177,818, dated May 23, 1876; application filed April 18, 1876.

*To all whom it may concern:*

Be it known that I, JOHN H. DOLDE, of St. Louis, in the county of St. Louis, and in the State of Missouri, have invented certain new and useful Improvements in Sporting-Powder; and do hereby declare that the following is a full, clear, and exact description thereof.

The nature of my invention consists in a compound for sporting-powder, as will be hereinafter more fully set forth.

This compound is composed of the following ingredients, in about the following proportions, viz: nine ounces chlorate of potash; three ounces powdered gall; one-half ounce yellow prussiate of potash. These ingredients are all to be powdered as fine as flour, and then properly sifted, when the mass is thoroughly mixed with cooked starch or water and granulated, in the usual manner.

I do not confine myself to the precise proportions of the ingredients mentioned, as they may, perhaps, be varied, according to the quality of powder desired.

Having thus fully described my invention, what I claim as new, and desire to secure by Letters Patent, is—

A compound for sporting-powder, consisting of chlorate of potash, gall, and yellow prussiate of potash, as herein set forth.

In testimony that I claim the foregoing I have hereunto set my hand this 17th day of April, 1876.

JOHN HENRY DOLDE.

Witnesses:
M. L. STOWELL,
C. M. ALEXANDER.